(12) United States Patent
Andonian et al.

(10) Patent No.: US 7,299,841 B2
(45) Date of Patent: Nov. 27, 2007

(54) TWO PIECE TIRE WITH IMPROVED TIRE TREAD BELT

(75) Inventors: Archie Arsavir Takfor Andonian, Hudson, OH (US); Kevin Christopher Legge, Uniontown, OH (US); Robert Anthony Neubauer, Medina, OH (US); Dale Eugene Wells, Massillon, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 11/145,682

(22) Filed: Jun. 6, 2005

(65) Prior Publication Data

US 2006/0042735 A1 Mar. 2, 2006

Related U.S. Application Data

(60) Provisional application No. 60/606,331, filed on Sep. 1, 2004.

(51) Int. Cl.
*B60C 9/18* (2006.01)
*B60C 11/02* (2006.01)

(52) U.S. Cl. .................. 152/175; 152/187; 152/209.6; 152/526

(58) Field of Classification Search ................ 152/175, 152/176, 187, 188, 209.6, 526
See application file for complete search history.

(56) References Cited

U.S. PATENT DOCUMENTS 3,224,481 A * 12/1965 Giuseppe ..................... 152/176
4,289,185 A * 9/1981 Franchini et al. ....... 152/176 X
2003/0201047 A1 10/2003 Rayman et al.

FOREIGN PATENT DOCUMENTS

EP 1 253 024 A1 4/2002
GB 1 200 001 * 7/1970

OTHER PUBLICATIONS

European Search Report, completed Dec. 8, 2005.

* cited by examiner

*Primary Examiner*—Adrienne C. Johnstone
(74) *Attorney, Agent, or Firm*—June E. Rickey

(57) ABSTRACT

A two-piece tire assembly with a removable tread belt for installing about the circumference of a tire carcass is provided. The two-piece tire assembly includes a tread belt comprised of two or more belt layers, each layer having one or more belts, wherein at least one of the belts in each layer has a chord length less than about 25% of the circumferential length of the belt.

5 Claims, 5 Drawing Sheets

# TWO PIECE TIRE WITH IMPROVED TIRE TREAD BELT

This application claims the benefit of U.S. provisional application No. 60/606,331, filed on Sep. 1, 2004.

TECHNICAL FIELD

This invention relates to pneumatic tires with removable tread belts and more particularly, to very large, two-piece tires for heavy equipment operation.

BACKGROUND OF THE INVENTION

Very large two piece tires, in which a removable tread belt is mounted upon a pneumatic structure, have been designed for use on large earthmover vehicles. The large two piece tires are subjected to high stress and loads under harsh environmental conditions such as in rock quarries, mines, foundries, and other areas where tires are subjected to puncture-producing and wear-inducing conditions.

Two engineering challenges separate the two piece tires from standard one-piece tires. The first engineering challenge is to retain the outer tread belt on the casing, which requires enough interfacial pressure between the tread belt and carcass. The second engineering challenge is to ensure that the tread has adequate circumferential stiffness to restrain the diametric growth of the casing. The tread ring must also have enough flexural compliance to have a non-zero interfacial pressure at the leading and trailing edges of the footprint, and low circumferential compliance to compress the belt package in the footprint in the circumferential direction. These opposing requirements make it difficult to design a two piece tire which is utilized under heavy load conditions.

With the continual drive to improve earthmover performance, there is a continuing need to provide novel methods and tire designs for improving earthmover tire durability. The present invention is directed to an improved pneumatic tire and removable tread belt assembly with which the frequency of premature tire failure is thought to be substantially reduced. The present invention is also directed to providing an improved pneumatic tire and tread belt assembly which is designed to allow large tires to be transported in several sections and then assembled at the construction site to ease the otherwise difficult problem of transporting the large tires, i.e. sometimes over 13 feet in height and approximately 8,000 to 15,000 pounds. Moreover, the present invention relates to an improved pneumatic tire and removable tread belt assembly with which the driving characteristics of the tire can be more economically changed and the inventory of the number of tire spares that are typically needed can be reduced.

SUMMARY OF THE INVENTION

A two-piece tire assembly with a removable tread belt for installing about the circumference of a tire carcass is provided. The two-piece tire assembly includes a tread belt comprised of two or more belt layers, each layer having one or more belts, wherein at least one of the belts in each layer has a cord length less than about 25% of the circumferential length of the belt.

A two-piece tire assembly having a removable tread belt for installing about the circumference of a tire carcass, the two-piece tire assembly comprising a tread belt comprised of one or more belt layers, at least one of said belt layers having two or more belts spaced apart a gap distance d.

DEFINITIONS

Figure 1:
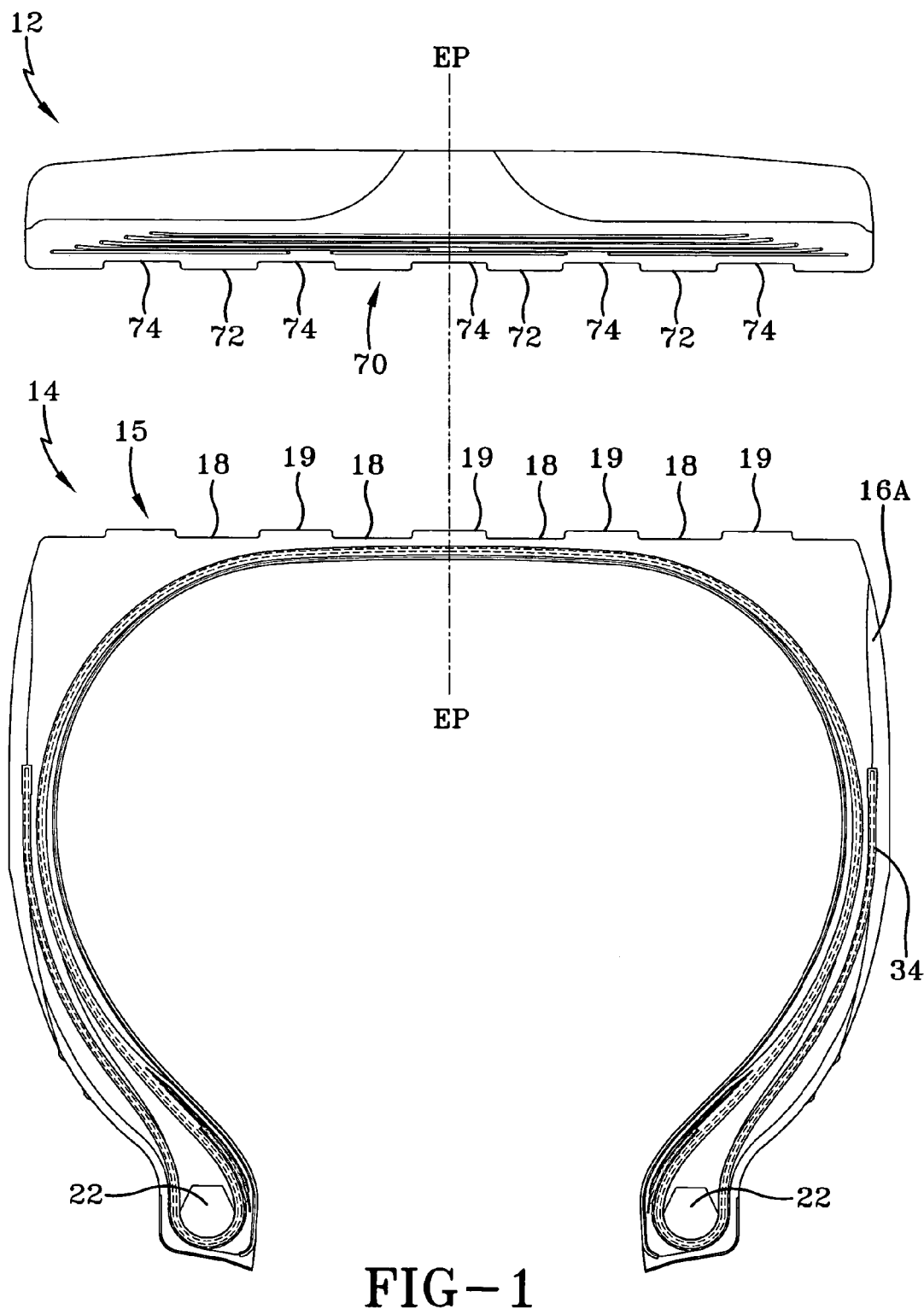
FIG. 1 is an exploded, cross-sectional view of a two-piece tire of the present invention.

"Apex" means a non-reinforced elastomer positioned radially about a bead core.

"Aspect ratio" of the tire means the ratio of its section height (SH) to its section width (SW) multiplied by 100% for expression as a percentage.

"Axial" and "axially" mean lines or directions that are parallel to the axis of rotation of the tire.

"Bead" means that part of the tire comprising an annular tensile member wrapped by the ply cords and shaped, with or without other reinforcement elements such as flippers, chippers, apexes, toe guards and chafers, to fit the design rim.

"Bias ply tire" means a tire having a carcass with reinforcing cords in the carcass ply extending diagonally across the tire from bead core to bead core at about 25-50 angle with respect to the equatorial plane of the tire. Cords run at opposite angles in alternate layers.

"Circumferential" means lines or directions extending along the perimeter of the surface of the annular tread perpendicular to the axial direction.

"Chafers" refers to narrow strips of material placed around the outside of the bead to protect cord plies from degradation and chaffing caused by movement of the rim against the tire.

"Chippers" means a reinforcement structure located in the bead portion of the tire.

"Cord" means one of the reinforcement strands of which the plies in the tire are comprised.

"Equatorial plane (EP)" means the plane perpendicular to the tire's axis of rotation and passing through the center of its tread.

"Flipper" means a reinforced fabric wrapped about the bead core and apex.

"Footprint" means the contact patch or area of contact of the tire tread with a flat surface under load and pressure.

"Inner liner" means the layer or layers of elastomer or other material that form the inside surface of a tubeless tire and that contain the inflating gas or fluid within the tire.

"Net-to-gross ratio" means the ratio of the tire tread rubber that makes contact with the road surface while in the footprint, divided by the area of the tread in the footprint, including non-contacting portions such as grooves.

"Nominal rim diameter" means the diameter of the rim base at the location where the bead of the tire seals.

"Normal inflation pressure" refers to the specific design inflation pressure at a specific load assigned by the appropriate standards organization for the service condition for the tire.`

"Normal load" refers to the specific load at a specific design inflation pressure assigned by the appropriate standards organization for the service condition for the tire.

"Ply" means a continuous layer of rubber-coated parallel cords.

"Radial" and "radially" mean directions extending radially toward or away from the axis of rotation of the tire.

"Radial-ply tire" means a belted or circumferentially-restricted pneumatic tire in which the ply cords which extend from bead to bead are laid at cord angles between 65 and 90 with respect to the equatorial plane of the tire.

"Section height (SH)" means the radial distance from the nominal rim diameter to the outer diameter of the tire at its equatorial plane.

DETAILED DESCRIPTION OF THE INVENTION

With reference to FIG. 1, there is illustrated a cross-section of a two-piece pneumatic tire 10 of the present invention. While the invention would work for smaller tires, it is more applicable to very large tires with rim diameters on the order of 35 inches and above. Further, the two piece tire of the present invention is designed for very large, heavy earth moving equipment and rough terrain. The tires are typically inflated to a high pressure, on the order of about 100 pounds per square inch (psi) or more with air or nitrogen.

The improved tread belt pneumatic tire 10 includes a ground engaging, circumferentially extending tread belt 12 mounted on a radially reinforced, beaded tire carcass 14. The details of the construction of tire carcass 14 and tread belt are described in more detail, below.

Tire Carcass

Figure 3:
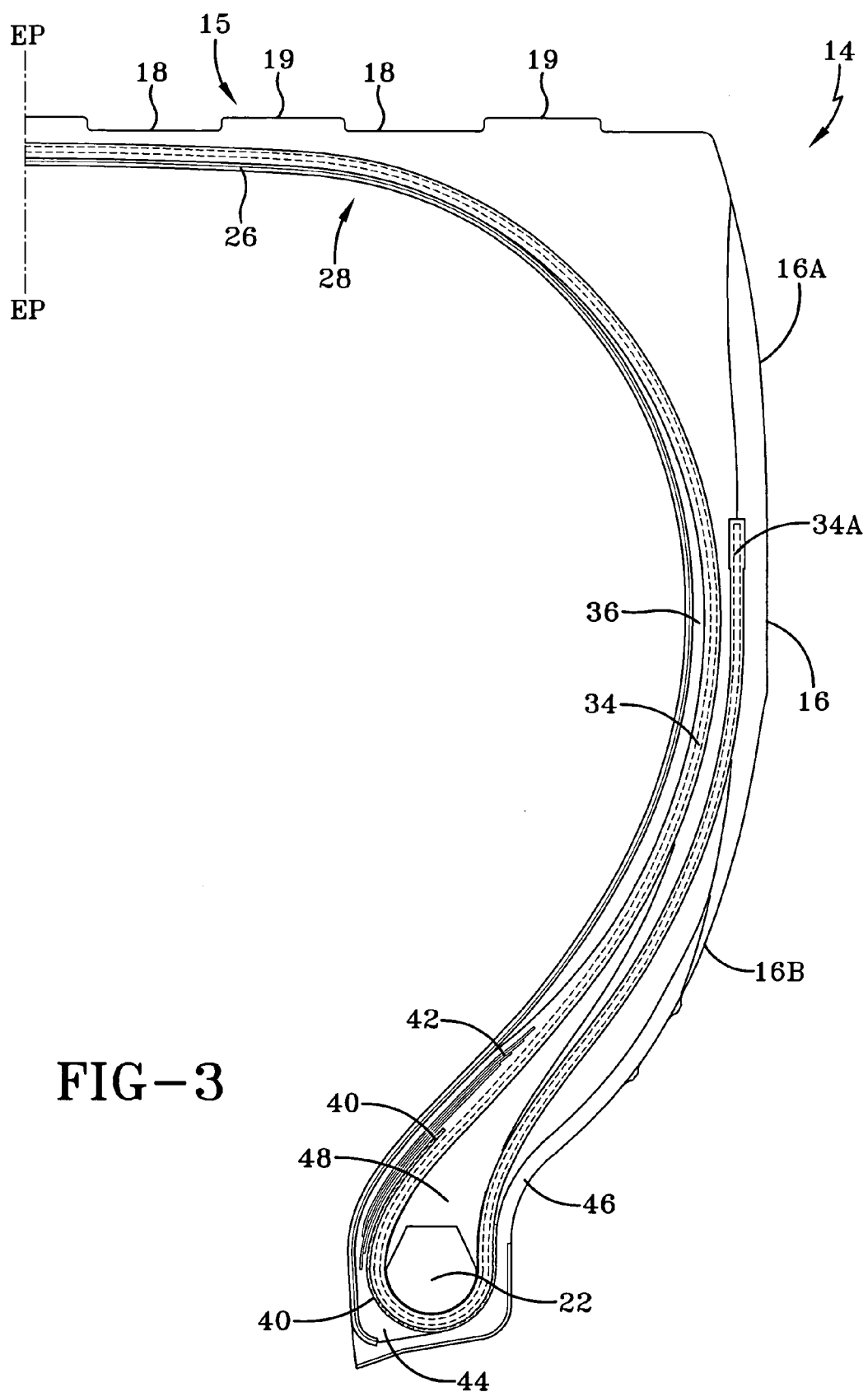
FIG. 3 is an enlarged, cross-sectional view of half of the carcass of the tire shown in FIG. 1.
Figure 4:
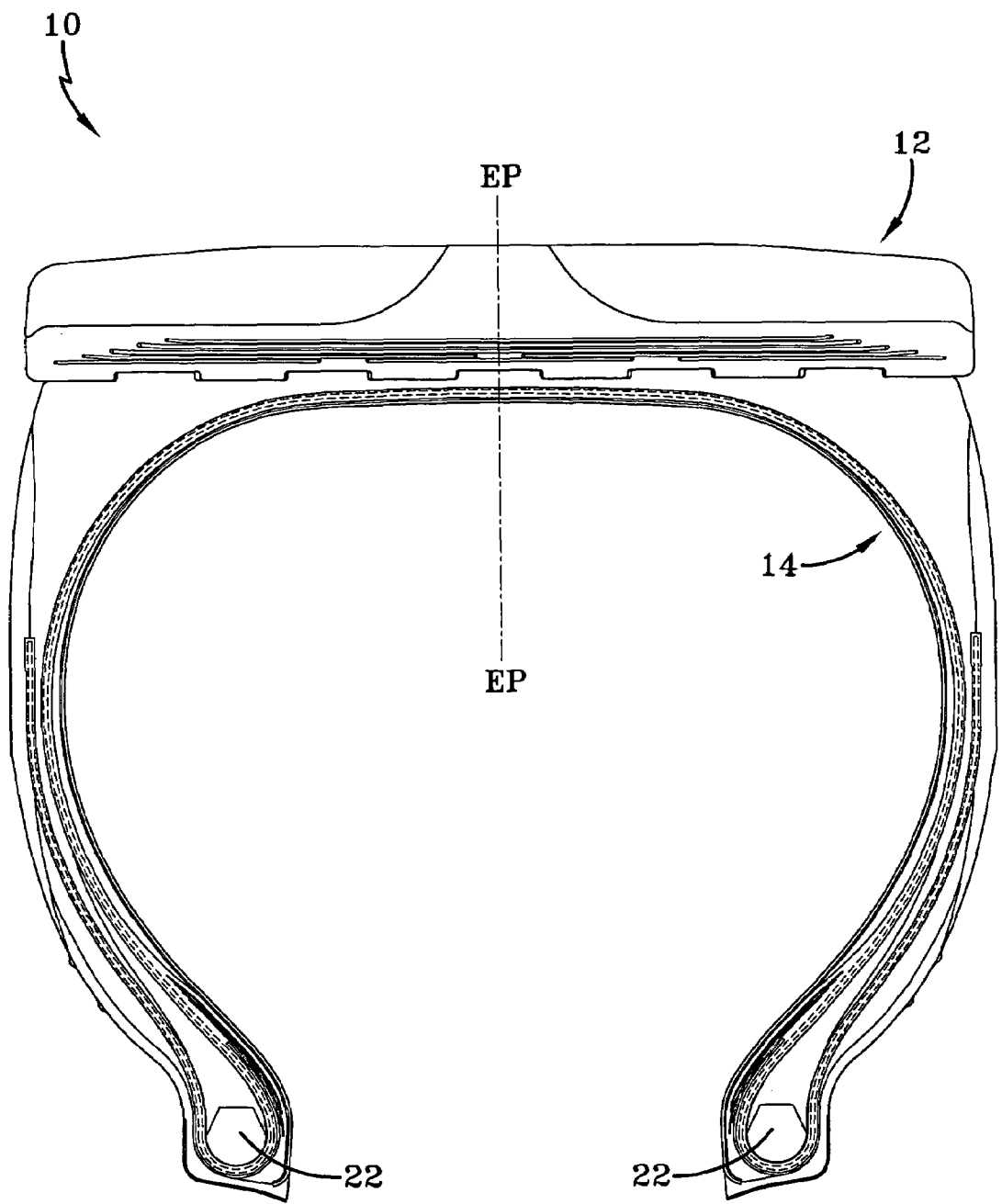
FIG. 4 is a cross-sectional view of the assembled tread belt and carcass forming a two piece tire.

Referring to FIG. 3, one embodiment of a tire carcass 14 suitable for the invention is shown. The carcass preferably includes a radially outer surface 15 having a plurality of lands 16 and grooves 19 for mating with aligned, opposing grooves 74 and lands 72 of tread belt 12. Preferably, the outer radial surface 15 has a thin abrasion resistant compound layer 82 for forming a longwearing surface between the tread belt 12 and the carcass 14.

The tire carcass 14 generally includes a pair of tire sidewalls 16 extending radially inwardly from the outer circumferential surface 15 of the tire carcass and terminating at their radial extremities in a pair of bead wires 22. The sidewalls 16 each have an upper portion 16a in the shoulder region of tire carcass 14 and radially inward of the maximum section width of the tire carcass, and a lower portion 16b adjacent the bead wires 22 and radially inward of the maximum section width of the tire carcass 14.

The carcass further includes an inner ply liner 26 that covers the entire interior facing surface 28 of the tire carcass 14 and serves to hold the air within the carcass that is used to inflate tire 10. The carcass 14 further includes in its construction at least one rubber laminated ply layer 34 of tire cord fabric which extends radially inwardly from the outer circumferential surface 20 of the tire carcass, also called the crown area of the tire carcass, and has turnup end 34a which wrap or loop around a bead wire 22. The bead wire 22 preferably has a rounded bottom edge. Although the carcass ply 34 is shown as being of single ply construction, a multi-ply construction can be employed if desired. Preferably, the carcass ply 34 is made of a rubber laminated ply of steel cord, but it can be made of a non-steel carcass reinforcing material.

Between the innerliner 26 and the ply layer 34 is an optional barrier rubber layer 36 which backs up the entire length of ply layer 34 and is formed of a soft compound of rubber which squeezes against the ply layer 34.

An optional steel chipper 40 wraps around the ply 34 and the bead wire 22 and extends upwardly past the bead. The steep chipper 40 is preferably surrounded by one or more optional chippers 42 for further reinforcement of the bead area. Adjacent the chipper and surrounding the bead area is an inner chaffer 44 and an outer chaffer 46. A chipper pad 50 is located between chapper 46 and ply 34, near the outer lower sidewall 16b. A triangular shaped reinforcement member or apex 48 extends radially outward from the bead until about mid-sidewall. The apex 48 stiffens the bead area and helps to prevent the tire sidewall from bending over the flange (not shown).

Tread Belt

The ground engaging, circumferentially extending tread belt 12 is removably mountable onto tire carcass 14. As best shown in FIG. 1, the underside or inner circumference surface 70 of tread belt 12 comprises a plurality of annular lands 72 and grooves 74 that mate with corresponding aligned grooves 18 and lands 19 of tire carcass 14. The mating lands and grooves function to restrain belt 12 from lateral or axial movement with respect to the carcass 14. The tire tread belt 12 includes a tread portion 80 on the outer radial surface for engagement with the ground.

The tread belt further comprises two or more belt layers, wherein each belt layer is preferably comprised of steel cords. One wire construction suitable for use in the belt layer is described in U.S. Pat. No. 6,272,830, granted Aug. 14, 2001 entitled STEEL CORD FOR REINFORCING ELASTOMERIC ARTICLES, which is incorporated by reference herein in its entirety. The invention is not limited to a particular wire construction, as there may be many wire constructions suitable for use with the invention. Each tread belt layer may comprise one or more belts. It is preferred that at least one of the belts has a maximum belt width Wmax according to the following equation:

$$W\text{max} = Lc \sin \alpha <= \Pi * [(D - 2NS)/4] * \sin \alpha \tag{1}$$

Where: Wmax is the maximum belt width,
Lc is the cord length of the belt
α is the belt cord angle,
D is the outside tire diameter, and
NS is the tread non-skid depth.

This equation is based upon the requirement that the cord length of a belt should always be less than the 25% of the circumferential length of the belt, in order to reduce the compressive strain load in each wire. Thus if the tread belt width is greater than Wmax, then the belt in each layer is split into two or more belts with a gap in between, so that Wmax is not exceeded. The gap is sized so that the two or more belts are independent of each other. It is more preferable that all of the belts have a maximum belt width that satisfies the above equation (1). It is even more preferable that the belt package comprise four belt layers, wherein each belt in each layer has a maximum belt width that satisfies the above equation 1. Any of the belts may have a bias angle in the range of about +/−3 to about +/−60 degrees, and more preferably in the range of about +/−5 to about +/−35 degrees.

The belt package may further include an optional outer layer 88 which has the steel cords oriented at 900 relative to the circumferential direction.

EXAMPLE 1

BELT PACKAGE FOR A 42 Inch Wide Tread Ring

| Belt Layer | Belt Angle, deg | Belt Type | Cord Type | Total belt width |
|---|---|---|---|---|
| 1 | +10 | Three 12" belts spaced apart with a gap of 1.5 inches | ES | 39" |
| 2 | −10 | Two 17.5 inch belts spaced apart a gap distance of 2 inches | ES | 37" |
| 3 | +20 | Single belt | EP | 35" |
| 4 | −20 | Single Belt | EP | 33" |
| 5 (optional) | 90 | Single belt | EP | 31" |

Figure 2:
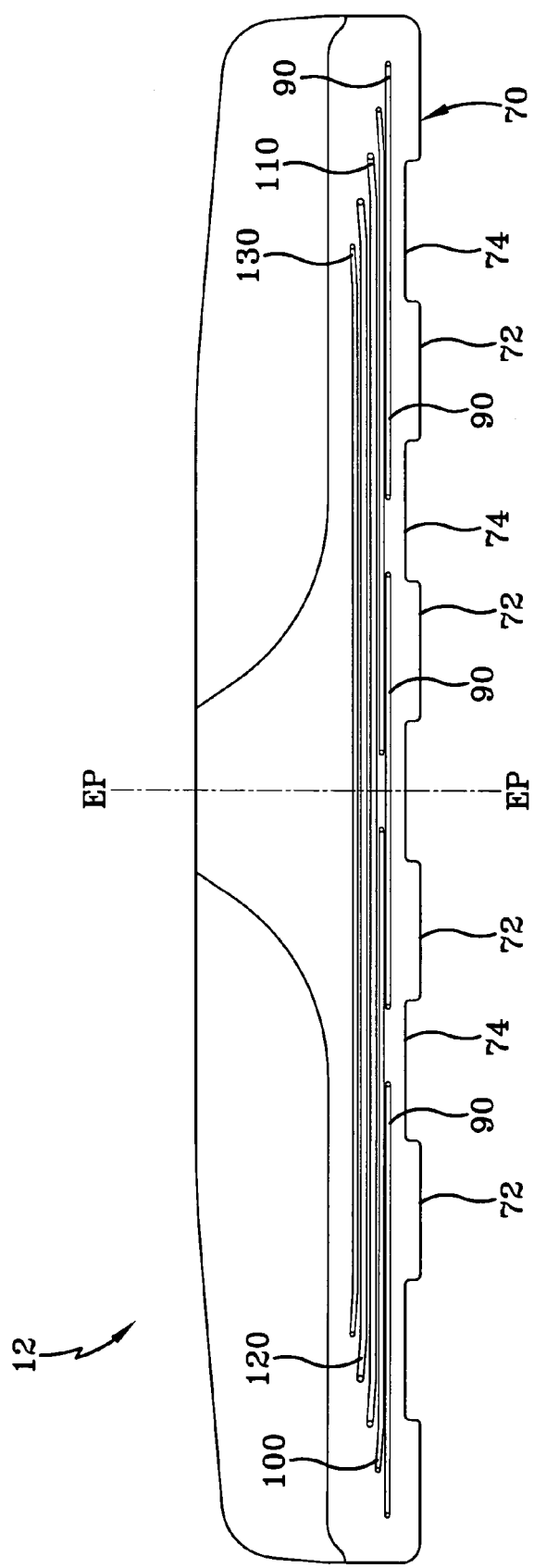
FIG. 2 is an enlarged, cross-sectional view of the tread belt shown in FIG. 1.
Figure 2A:
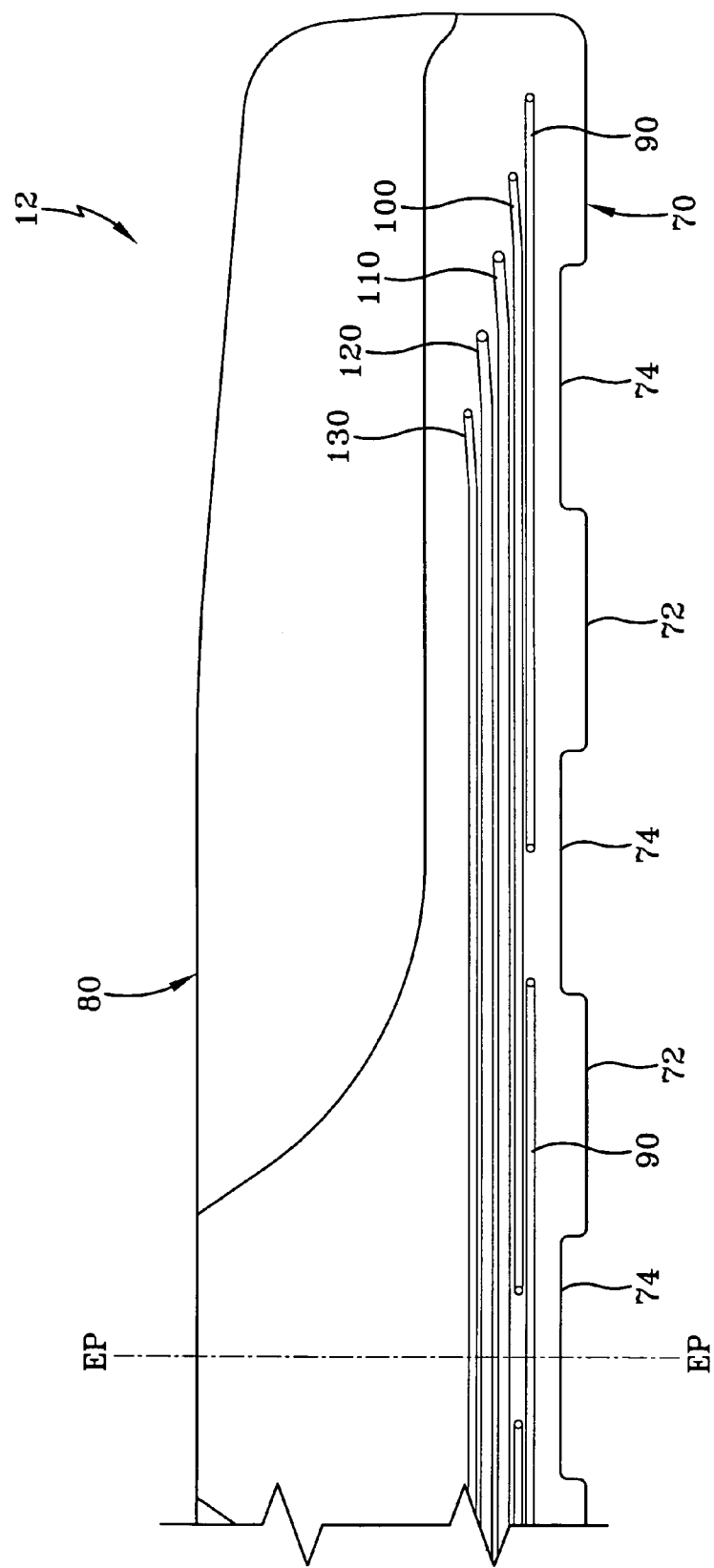
FIG. 2a is an enlarged, cross-sectional view of half of the tread belt shown in FIG. 2.

The above chart describes a belt package comprising four belts with an optional fifth belt, and is shown in FIGS. 2 and 2A. Belt layer one 90 is the radially innermost belt layer, and comprises three separate belts spaced apart a gap distance, and having a bias angle of 10 degrees. Belt layer one 90 is preferably the widest belt layer of all the layers. Belt layer two 100 is located radially outward and adjacent belt layer one, and comprises a belt angle of −10 degrees. The 10 degree belt layers are used to provide a circumferential constraint in order to control the diametral growth of the tire. Belt layer three 110 is a single belt located radially outward and adjacent belt layer two 100, and has a belt angle of 20 degrees. Belt layer four 110 is also a single belt located outward of belt layer three 100, and has a belt angle of −20 degrees. Belt layer five 120 is optional, and comprises a single belt oriented at 90 degrees. The five belt layup is thus preferably widest at the radially innermost layer, and has a pyramidal structure with one inch edge belt stepoffs to eliminate high gradients in flexural stiffness in the radial cross section. The belt package has four active belt layers (1-4) and three active belt interfaces (½, ⅔ and ¾) to keep the hysteretic heat generation low and the operating tread ring temperature below critical temperatures.

With respect to the type of cord used in each belt layer, EP means a steel cord having a construction of 7×(3+9+15)× 0.245+1 HT. ES means a steel cord having a construction of (0.4+6×0.365)+6×(0.365+6×0.35)ST.

EXAMPLE TWO

Belt Package

| Belt Layer | Belt Angle, deg | Cord Type | Total belt width |
|---|---|---|---|
| 1 | 30.0 R | ES | 25" to 35" |
| 2 | 22.0 L | EP | 40" |
| 3 | 22.0 R | EP | 36" to 38" |
| 4 | 10.0 R | EP | 17" to 33" |
| 5 | 10.0 L | EP | 14" to 30" |

The above chart describes a belt package comprising five belt layers. Belt layer one is the radially innermost belt layer, and comprises one or more belts having a bias angle of 30 R. If two or more belts are used, the belts are spaced apart a gap distance. Belt layer one has a width in the range of about 25 to about 35 inches. Belt layer two is located radially outward and adjacent belt layer one, and comprises a belt angle of 22 L. One or more belts may comprise belt layer two and having a belt width about 40 inches. Belt layer three is located radially outward and adjacent belt layer two, and has a belt angle of 22 R, and a width in the range of about 36 to about 38 inches. Belt layer four is located radially outward of belt layer three, and has a belt angle of 10 R, and a width in the range of about 17 to 33 inches. Belt layer five comprises a belt oriented at 10 L, and a width in the range of about 14 to about 30 inches. The five belt layup is thus preferably narrowest at the radially innermost layer.

EXAMPLE THREE

Belt Package

| Belt Layer | Belt Angle, deg | Cord Type | Total belt width |
|---|---|---|---|
| 1 | 30.0 R | ES | 25" |
| 2 | 22.0 L | EP | 40" |
| 3 | 22.0 R | EP | 36" |
| 4 | 22.0 L | ES | 32" |
| 5 | 10.0 R | ES | 17" |
| 6 | 10.0 L | ES | 14" |

EXAMPLE FOUR

Belt Package

| Belt Layer | Belt Angle, deg | Cord Type | Total belt width |
|---|---|---|---|
| 1 | 10.0 R | ES | 14" |
| 2 | 10.0 L | ES | 17" |
| 3 | 30.0 R | EP | 40" |
| 4 | 30.0 L | EP | 36" |
| 5 | 22.0 R | ES | 32" |
| 6 | 22.0 L | ES | 25" |

The tread belt 12 and carcass interface in the above examples and description of the invention may be such that an interference fit occurs (the tread belt is smaller than the inflated carcass). The interference fit may be non-linear, so that the interference fit may be greater near the shoulder of the carcass/tread interface.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A two-piece tire assembly having a removable tread belt for installing about the circumference of a tire carcass, the two-piece tire assembly comprising:
a tread belt comprised of two or more belt layers, each layer having one or more belts, wherein the radially innermost layer is comprised of three belts separated by a gap, and a radially outer layer comprised of two or more belts separated by a gap, and at least one of said belts in each layer have a cord length less than about 25% of the circumferential length of the belt.

2. The two piece tire assembly of claim 1 wherein each of said belts has a bias angle greater than +/−5 degrees.

3. The two piece tire assembly of claim 1 having three or more belt layers, wherein the radially innermost belt layer is wider than the other layers.

4. The two piece tire assembly of claim 1 having three or more belt layers in a pyramidal structure.

5. The two piece tire assembly of claim 1 wherein the first innermost belt layer comprises two belts separated by a gap.

* * * * *